(12) United States Patent
Xiao et al.

(10) Patent No.: US 11,901,990 B2
(45) Date of Patent: Feb. 13, 2024

(54) INFORMATION FEEDBACK METHOD AND APPARATUS, INFORMATION RECEIVING METHOD AND APPARATUS, INFORMATION ACQUISITION METHOD AND APPARATUS, COMMUNICATION NODE AND STORAGE MEDIUM

(71) Applicant: ZTE CORPORATION, Shenzhen (CN)

(72) Inventors: Huahua Xiao, Shenzhen (CN); Yu Ngok Li, Hong Kong (CN); Chuangxin Jiang, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/615,010

(22) PCT Filed: Apr. 20, 2020

(86) PCT No.: PCT/CN2020/085599
§ 371 (c)(1),
(2) Date: Nov. 29, 2021

(87) PCT Pub. No.: WO2020/238471
PCT Pub. Date: Dec. 3, 2020

(65) Prior Publication Data
US 2022/0231741 A1    Jul. 21, 2022

(30) Foreign Application Priority Data
May 27, 2019 (CN) .......................... 201910448094.1

(51) Int. Cl.
*H04B 7/06* (2006.01)
*H04W 4/029* (2018.01)

(52) U.S. Cl.
CPC .......... *H04B 7/0626* (2013.01); *H04W 4/029* (2018.02)

(58) Field of Classification Search
CPC .... H04B 7/0626; H04B 7/0695; H04B 7/088; H04B 7/0617; H04B 7/0834; H04B 7/086;
(Continued)

(56) References Cited

U.S. PATENT DOCUMENTS 11,012,878 B2    5/2021  Lee et al.
11,258,524 B2*   2/2022  Gulati ................... H04L 1/0003
(Continued)

FOREIGN PATENT DOCUMENTS

CN    104184537 A    12/2014
CN    106301505 A    1/2017
(Continued)

OTHER PUBLICATIONS

Huawei et al., "Physical layer procedure for NR positioning", *3GPP TSG RAN WG1 Meeting #96b R1-1904006*, Apr. 12, 2019 (Apr. 12, 2019), entire document.
(Continued)

*Primary Examiner* — Sophia Vlahos
(74) *Attorney, Agent, or Firm* — Morgan, Lewis & Bockius LLP

(57) ABSTRACT

Provided are an information feedback method and apparatus, an information receiving method and apparatus, an information acquisition method and apparatus, a communication node and a storage medium. The information feedback method includes: acquiring K pieces of position information after a reference time; and feeding back the K pieces of position information, where K is a positive integer.

16 Claims, 6 Drawing Sheets

(58) Field of Classification Search
CPC .... H04B 7/0897; H04B 7/063; H04B 7/0634; H04W 16/28; H04W 72/046; H04W 64/006; H04W 4/029
See application file for complete search history.

(56) References Cited

U.S. PATENT DOCUMENTS

| | | | |
|---|---|---|---|
| 11,324,018 B2* | 5/2022 | Chen | H04W 72/23 |
| 11,438,057 B2* | 9/2022 | Hyslop | H04B 7/18506 |
| 2009/0196362 A1* | 8/2009 | Song | H04L 5/0032 375/260 |
| 2011/0217984 A1* | 9/2011 | Keskitalo | H04L 1/0026 455/452.2 |
| 2012/0113816 A1* | 5/2012 | Bhattad | H04W 72/27 370/246 |
| 2014/0314167 A1 | 10/2014 | Jeong et al. | |
| 2015/0038156 A1* | 2/2015 | Kilpatrick, II | H04W 74/0833 455/561 |
| 2015/0189568 A1* | 7/2015 | Stanze | H04B 7/0417 370/331 |
| 2016/0191201 A1* | 6/2016 | Park | H04B 7/066 370/252 |
| 2016/0380820 A1* | 12/2016 | Horvitz | H04W 16/28 370/254 |
| 2017/0086199 A1* | 3/2017 | Zhang | H04W 48/20 |
| 2017/0134148 A1* | 5/2017 | Yerramalli | H04W 72/23 |
| 2017/0150487 A1* | 5/2017 | Zhou | H04B 7/04 |
| 2017/0265182 A1* | 9/2017 | Guo | H04W 72/21 |
| 2018/0115357 A1 | 4/2018 | Park et al. | |
| 2018/0115958 A1* | 4/2018 | Raghavan | H04B 7/0697 |
| 2018/0146389 A1* | 5/2018 | Nagata | H04W 24/08 |
| 2018/0343047 A1* | 11/2018 | He | H04B 7/0645 |
| 2019/0006754 A1* | 1/2019 | Pallister | H04B 7/0617 |
| 2020/0136711 A1* | 4/2020 | Cao | H04B 7/0691 |
| 2021/0111767 A1* | 4/2021 | Benjebbour | H04W 16/28 |

FOREIGN PATENT DOCUMENTS

| | | |
|---|---|---|
| CN | 108111278 A | 6/2018 |
| CN | 108282321 A | 7/2018 |
| CN | 108288991 A | 7/2018 |
| CN | 108696889 A | 10/2018 |
| CN | 109120315 A | 1/2019 |
| CN | 110536231 A | 12/2019 |
| WO | WO2016000092 A1 | 1/2016 |
| WO | WO2019/062552 A1 | 4/2019 |

OTHER PUBLICATIONS

International Search Report for Application No. PCT/CN2020/085599, dated Jul. 22, 2020, 6 pages including English translation.
Zte et al., "NR positioning measurements", *3GPP TSG RAN WG1 Meeting #97 R-1-1906426*, May 17, 2019 (May 17, 2019), entire document.
Ericsson, "Beam Level MDT Measurement for positioning", 3GPP TSG-RAN WG2 Meeting #106, R2-1906880, May 13-17, 2019, Reno, USA, 3 pages.
Chinese First Search Report in Application No. 201910448094.1 dated Jul. 28, 2022, 5 pages including English Translation.
Chinese First Office Action in Application No. 201910448094.1 dated Aug. 3, 2022, 13 pages including English Translation.
Chinese Search Report in Application No. 201910448094.1 dated Feb. 6, 2023, 5 pages including English Translation.
Chinese Office Action in Application No. 201910448094.1 dated Feb. 8, 2023, 18 pages including English Translation.
Catt, "Summary#2 of UE and gNB measurements for NR Positioning," 3GPP TSG RAN WG1 Meeting #96bis, R1-1905760, Xi'an, China, Apr. 8-12, 2019, 26 pages.
Extended European Search Report of Application No. 20812713.4, dated May 4, 2023, 9 pages.

\* cited by examiner

INFORMATION FEEDBACK METHOD AND APPARATUS, INFORMATION RECEIVING METHOD AND APPARATUS, INFORMATION ACQUISITION METHOD AND APPARATUS, COMMUNICATION NODE AND STORAGE MEDIUM

CROSS-REFERENCES TO RELATED APPLICATIONS

This is a National Stage Application, filed under 35 U.S.C. 371, of International Patent Application No. PCT/CN2020/085599, filed on Apr. 20, 2020, which is based on and claims priority to Chinese Patent Application No. 201910448094.1 filed with the China National Intellectual Property Administration (CNIPA) on May 27, 2019, the disclosure of which is incorporated herein by reference in its entirety.

TECHNICAL FIELD

Embodiments of the present application relate to the technical field of wireless communication, for example, to an information feedback method and apparatus, an information reception method and apparatus, an information acquisition method and apparatus, a communication node and a storage medium.

BACKGROUND

The multi-antenna technology is an important means to improve the performance of the wireless communication system. To make good use of the multi-antenna technology, it is necessary to acquire accurate channel state information (CSI). Especially in the high frequency technology, as the carrier frequency increases, the path loss will also increase. To ensure the coverage, multi-array antennas are generally used to obtain beamforming gain, so as to compensate for the path loss by using the beamforming gain. In addition, to obtain the beam gain, the user needs to select the best sending and/or reception beam matching the user channel according to channels.

On the other hand, positioning is also an important technology in wireless communication. For example, positioning has been standardized in Long-Term Evolution (LTE) and Long Term Evolution-Advanced (LTE-A), and in the New Radio (NR) Access Technology, standardization work will also be performed. However, the positioning technology cannot be well applied to the acquisition of channel state information.

SUMMARY

The present application provides an information feedback method and apparatus, an information reception method and apparatus, an information acquisition method and apparatus, a communication node and a storage medium. In this way, the performance of the wireless communication system is improved by fully utilizing a positioning technology.

An information feedback method provided by the present application includes steps described below. K pieces of location information after a reference time are acquired. The K pieces of location information are fed back, where K is a positive integer.

An information reception method further provided by the resent application includes the step described below. K pieces of location information are received, where the K pieces of location information is K pieces of location information after a reference time, and K is a positive integer.

An information feedback method further provided by the present application includes steps described below. N pieces of beam information after a reference time are acquired. The N pieces of beam information are fed back or indicated, where N is a positive integer.

An information acquisition method further provided by the present application includes the step described below. N pieces of beam information are acquired through a manner of reception or a manner of self-determination, where the N pieces of beam information are N pieces of beam information after a reference time, and N is a positive integer.

An information feedback apparatus further provided by the present application includes a first acquisition module and a first feedback module. The first acquisition module is configured to acquire K pieces of location information after a reference time. The first feedback module is configured to feed back the K pieces of location information, where K is a positive integer.

An information acquisition apparatus further provided by the present application includes a reception module. The reception module is configured to receive K pieces of location information, where the K pieces of location information is K pieces of location information after a reference time, and K is a positive integer.

A communication node further provided by the present application includes a memory and a processor. The memory is configured to store a computer program which, when executed by the processor, implements any one of the above information feedback methods.

A communication node further provided by the present application includes a memory and a processor. The memory is configured to store a computer program which, when executed by the processor, implements the above information reception method or the above information acquisition method.

A computer-readable storage medium further provided by the present application is configured to store a computer program which, when executed by a processor, implements the above information feedback method.

A computer-readable storage medium further provided by the present application is configured to store a computer program which, when executed by a processor, implements the above information reception method or the above information acquisition method.

In the present application, a first communication node acquires K pieces of location information after a reference time, and feeds back the K pieces of location information to a second communication node. The first communication node may support the second communication node to acquire or predict future channel state information by feeding back the location information after the reference time to the second communication node. According to the present application, the acquisition or prediction of more accurate channel state information may be supported by using the positioning technology, so that the performance of the wireless communication system is improved.

DETAILED DESCRIPTION

Embodiments of the present disclosure will be described hereinafter in conjunction with drawings.

The steps illustrated in the flowcharts among the drawings may be performed by a computer system, such as a group of computer-executable instructions. Although logical sequences are shown in the flowcharts, the shown or described steps may be performed in sequences different from those described herein in some cases.

Figure 1:
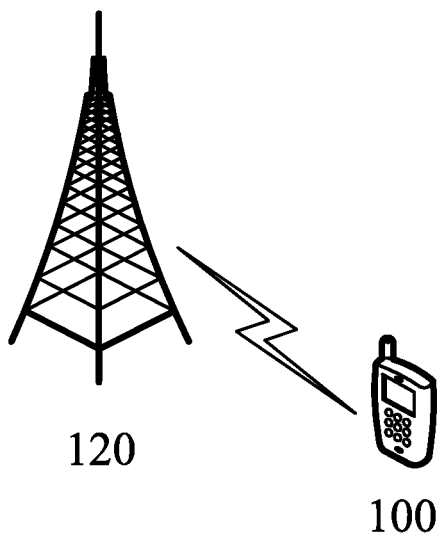
FIG. 1 is a schematic view of an application scenario according to an embodiment of the present application.

FIG. 1 is a schematic view of an application scenario according to an embodiment of the present application. As shown in FIG. 1, the communication system implementing the method provided by the embodiment of the present application may include a first communication node 100 and a second communication node 120.

The communication system shown in FIG. 1 is merely an example, and the embodiment of the present application is not limited thereto. For example, both the first communication node and the second communication node may be more than one. The technical solution of the embodiment of the present application may be applied to various communication systems, such as the Long-Term Evolution (LTE) system, LTE time-division duplexing (TDD) system, the Universal Mobile Telecommunication System (UMTS), the 5th Generation (5G) New Radio (NR) communication system, etc.

The second communication node 120 may be an Evolved Node B (eNB or eNodeB) in LTE, a base station device in a 5G network, a base station in a future communication system, etc. The base station may include various network side devices such as a macro base station, a micro base station, a Home Node B, a radio remote, a router, a location server, or a primary cell and a secondary cell, and location management function (LMF) devices.

The first communication node 100 may be a terminal device, or may also be referred to as an access terminal, a user equipment (UE), a user unit, a user station, a mobile radio station, a mobile station, a remote station, a remote terminal, a mobile device, a user terminal, a terminal, a wireless communication device, a user agent or a user apparatus. For example, the terminal device may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, or a terminal device in a 5G network, etc. However, it is not limited in the present application.

The example in which the first communication node is a terminal and the second communication node is a base station is described below.

Herein, the base station configures measurement resource information, and the measurement resource information is used for acquiring channel state information (CSI). The measurement resource information may include N1 pieces of channel measurement resource (CMR) information and M1 pieces of interference measurement resource (IMR) information, and N1 and M1 are both positive integers. The base station configures measurement resource information corresponding to a report in a report configuration (report config) or a reporting setting. The N1 pieces of CMR information are used for the terminal to measure the channel state, and the M1 pieces of IMR information are used for the terminal to measure the interference.

A CMR configuration (CMR config) or a CMR setting includes at least one of: a channel measurement resource set (CMR set) or an interference measurement resource set (IMR set). One channel measurement resource set includes at least one channel measurement resource, and one interference measurement resource set includes at least one interference measurement resource. The channel measurement resource represents a reference signal resource for channel measurement and may include, but is not limited to, a channel state information-reference signal (CSI-RS) resource, a synchronization signal block (SSB) resource, a physical broadcast channel (PBCH) resource, a synchronization signal block/physical broadcast channel (SSB/PBCH) resource, an uplink sounding reference signal (SRS) resource and a positioning reference signal (PRS) resource. The CSI-RS resource mainly refers to a non-zero power channel state information-reference signal (NZP-CSI-RS) resource. The interference measurement resource may include, but is not limited to, channel state information-interference measurement (CSI-IM), an NZP-CSI-RS for interference measurement and a zero power channel state information-reference signal (ZP-CSI-RS). In one time of interference measurement, the M1 interference measurement resources included in the interference measurement resource may include at least one of a NZP-CSI-RS, CSI-IM or a ZP-CSI-RS, for example, only include CSI-IM, or include CSI-IM and a NZP-CSI-RS, or only include a ZP-CSI-RS, or include a NZP-CSI-RS and a ZP-CSI-RS.

The channel state information may include at least one of: a channel state information-reference signal resource indicator (CRI), a synchronization signal block resource indicator (SSBRI), Reference Signal Received Power (RSRP), differential RSRP, a channel quality indicator (CQI), a precoding matrix indicator (PMI), a layer indicator (LI), a rank indicator (RI), a level 1 signal-to-interference-plus-noise ratio (L1-SINR) or a differential L1-SINR.

A channel state information-reference signal resource indicator (CRI) with a value of i indicates an i-th CSI-RS resource, where i=0, 1, . . . , N2, and N2 is the number of CSI-RS resources.

A synchronization signal block resource indicator (SSBRI) with a value of i indicates an i-th SSB and/or PBCH resource, where i=0, 1, . . . , N3, and N3 is the number of SSB resources.

A spatial characteristic includes at least one of following parameters: a quasi co-location (QCL), a transmission configuration indication (TCI), a transmission configuration state, a QCL type D, a receive spatial characteristic, a transmit spatial characteristic, a receive beam group, a transmit beam group, a receive beam, a transmit beam or a spatial receive (Rx) parameter. The same spatial characteristic refers to the same value of at least one of the preceding spatial characteristic parameters. In an embodiment, the spatial characteristic mainly includes a QCL type D or a spatial Rx parameter.

The QCL may include a QCL type A, a QCL type B, a QCL type C and a QCL type D. Two ports satisfying the QCL relationship represents that large-scale information of one port may be derived from large-scale information of the other port. The large-scale information includes but is not limited to: a Doppler shift, a Doppler spread, an average delay, a delay spread and a spatial Rx parameter. The classification of one QCL type is as follows:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}.

Two reference signals satisfy a quasi co-location relationship with respect to one type of quasi co-location parameter includes at least one of the following: a quasi co-location parameter of one reference signal may be acquired according to a quasi co-location parameter of the other reference signal, or the two reference signals have the same quasi co-location reference signal with respect to the one type of quasi co-location parameter. For example, a quasi co-location reference signal of CSI-RS1 with respect to a spatial receive parameter is CSI-RS3, and a quasi co-location reference signal of CSI-RS2 with respect to the spatial receive parameter is CSI-RS3. Then, CSI-RS1 and CSI-RS2 satisfy the quasi co-location relationship with respect to the spatial receive parameter.

Herein, an occasion, a timestamp and a reference time are concepts that may be replaced with each other, indicating a certain time point or a reference time point. The occasion, the timestamp and the reference time may include at least one of following time units: a slot, a symbol, a slot group, a symbol group, X milliseconds or Y microseconds. The symbol group includes at least one symbol (for example, a mini-slot), and the slot group includes at least one slot. X and Y are both positive real numbers.

The symbol herein refers to a time unit in a subframe or a frame or a slot. For example, the symbol may be an orthogonal frequency-division multiplexing (OFDM) symbol, a single-carrier frequency-division multiple access (SC-FDMA) symbol and an orthogonal frequency-division multiple access (OFDMA) symbol.

Location information herein includes, but is not limited to, at least one of: a reference signal time difference (RSTD), a relative time of arrival (RTOA), an angle of arrival (AOA), an angle of departure (AOD), a zenith angle of departure (ZOD), a zenith angle of arrival (ZOA), an Rx-Tx time difference, Cartesian coordinates (x, y, z) reflecting physical locations, polar coordinates (r, a, b), a movement speed, a direction of the movement speed, movement acceleration, a direction of the movement acceleration, k-th order acceleration or a direction of the k-th order acceleration. The k-th order (e.g. k=1) acceleration represents the acceleration, and is a derivative of the movement speed. (k+1)-th order acceleration represents a derivative of the k-th order acceleration. k satisfies that k=1, . . . K1. K1 is an integer greater than or equal to 1, and the value of K1 may be configured by the second communication node or agreed by the first communication node and the second communication node. The speed or the k-th order acceleration and the direction of the speed and the direction of the k-th order acceleration may be values in the Cartesian coordinate system or values in the polar coordinate system. x, y, z are real numbers, r is a positive real number, and a and b are a horizontal angle and a vertical angle.

Beam information may include at least one of: an angle of arrival (AOA), an angle of departure (AOD), a ZOD, a ZOA, a discrete Fourier transform (DFT) vector, a codeword in a codebook, a transmit beam, a receive beam, a transmit beam group, a receive beam group, a transmit beam index, a receive beam index, a transmit beam group index or a receive beam group index. In addition, the index and the indicator herein are concepts that may be replaced with each other. Exemplarily, the terminal or the base station may transmit or feed back or indicate N pieces of beam information through at least one of higher layer signaling or physical layer signaling. For example, the base station may indicate N pieces of beam information through higher layer signaling and/or physical layer signaling. For example, the terminal may indicate N pieces of beam information through at least one quasi co-location (QCL) and/or at least one transmission configuration indicator (TCI), or the terminal may indicate N pieces of beam information through spatial relation information (for example, beam information used for a reference signal is beam information corresponding to a target signal), or the terminal may indicate N pieces of beam information through higher layer signaling or feed back N pieces of beam information through a physical uplink shared channel or a physical uplink control channel, for example, feed back a CRI or a synchronization signal block index (SSBI) corresponding to the beam information.

The angle corresponding to the beam information may include at least one of the AOA, the AOD, the ZOD or the ZOA.

The higher layer signaling includes radio resource control (RRC) signaling and media access control control element (MAC CE) signaling. The physical layer signaling includes downlink control information (DCI) in physical downlink control information or signaling fed back on the physical uplink control channel or the physical uplink shared channel.

Figure 2:
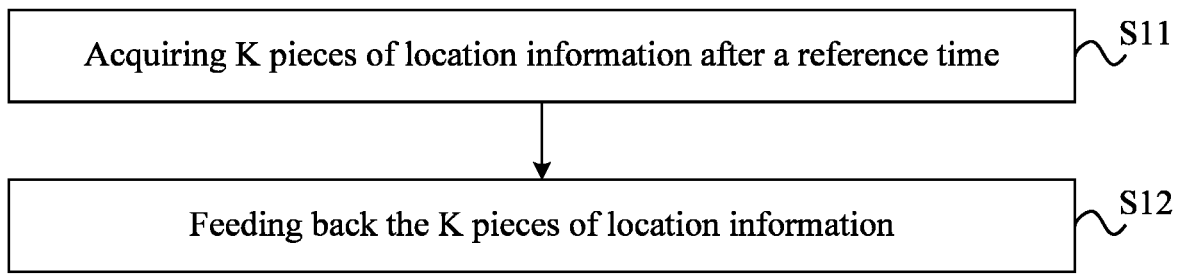
FIG. 2 is a flowchart of an information feedback method according to an embodiment of the present application.

FIG. 2 is a flowchart of an information feedback method according to an embodiment of the present application. The information feedback method provided by the embodiment may be applied to the above first communication node side. As shown in FIG. 2, the information feedback method provided by the embodiment includes steps described below.

In step S11, K pieces of location information after a reference time are acquired.

In step S12, the K pieces of location information are fed back, where K is a positive integer.

In an exemplary implementation, the terminal may acquire K pieces of location information after a reference time, and feed back the K pieces of location information to the base station.

Herein, the reference time may be a time point of F1 time units before a current time. At this time, part location information of the K pieces of location information is location information before the current time, and the part location information is predicted future location information. The reference time may be the current time, and at this time, all of the location information of the K pieces of location information is the predicted further location information. The time unit may be one of the symbol, the slot, the symbol group, the slot group, the X milliseconds and the Y microseconds, which can be determined through negotiations between the first communication node and the second communication node or be agreed by the first communication node and the second communication node. F1 is an integer less than or equal to K.

In an example implementation, the information feedback method of the embodiment may further include steps described below. N pieces of beam information corresponding to the K pieces of location information are acquired. The N pieces of beam information are fed back or indicated, where N is a positive integer, and N is greater than or equal to K. Exemplarily, the beam information may include at least one of: an angle of arrival (AOA), an angle of departure (AOD), a zenith angle of departure (ZOD), a zenith angle of arrival (ZOA), a discrete Fourier transform (DFT) vector, a codeword in a codebook, a transmit beam, a receive beam, a transmit beam group, a receive beam group, a transmit beam index, a receive beam index, a transmit beam group index or a receive beam group index. In addition, the index and the indicator herein are concepts that may be replaced with each other. Exemplarily, the terminal or the base station may transmit or feed back or indicate N pieces of beam information through at least one of higher layer signaling or physical layer signaling. For example, the base station may indicate N pieces of beam information through higher layer signaling and/or physical layer signaling. For example, the terminal may indicate N pieces of beam information through at least one quasi co-location (QCL) and/or at least one transmission control indicator (TCI), or the terminal may indicate N pieces of beam information through spatial relation information (for example, beam information used for a reference signal is beam information corresponding to a target signal), or the terminal may indicate N pieces of beam information through higher layer signaling or feed back N pieces of beam information through a physical uplink shared channel or a physical uplink control channel, for example, feed back a CRI or an SSBI corresponding to the beam information.

In an embodiment, the system is downlink transmission. For example, when the N pieces of beam information are transmit beams of the base station or receive beams of the terminal, the terminal feeds back or indicates the N pieces of beam information through a physical uplink control channel or a physical uplink shared channel. The beam information includes but is not limited to one of: a beam index, a beam group index, RSRP, differential RSRP, a differential L1-SINR, an L1-SINR, a ZOA, an AOA, an AOD, or an index of at least one of the ZOA, ZOD, AOA or AOD, an SSBRI or a CRI (since the beam information may also be implicit in a corresponding measurement resource, a resource index corresponding to the beam may also be fed back). The base station indicates the beam information used by the base station to the terminal through one of the higher layer signaling or the physical layer signaling.

In an embodiment, the system is uplink transmission. For example, when the N pieces of beam information are transmit beams of the terminal or receive beams of the base station, the number of beams and/or a transmit occasion of the N pieces of beam information may be determined by the terminal. Exemplarily, the terminal may feed back the value of N and/or information of a transmit occasion of N beams through a physical uplink control channel or a physical uplink shared channel, or the terminal may indicate the N pieces of beam information through spatial relation information. The base station may indicate L pieces of beam information finally used by the terminal through at least one of the higher layer signaling or the physical layer signaling, where the L pieces of beam information are a subset of the N pieces of beam information.

In an embodiment, the system is uplink transmission. For example, when the N pieces of beam information are transmit beams of the terminal or receive beams of the base station, the N pieces of beam information may be indicated by the terminal through at least one signaling of the higher layer signaling or the physical layer signaling.

In an exemplary implementation, the method of the embodiment may include the step described below. The N pieces of beam information are determined according to the K pieces of location information. Herein, the method that the N pieces of beam information are determined or acquired according to the K pieces of location information includes at least one of steps described below.

When the location information is one of an RSTD, an RTOA or an Rx-Tx time difference, a geographic location (including Cartesian coordinates or polar coordinates) of a UE is obtained according to one of the obtained RSTD, RTOA and Rx-Tx time difference of at least two base stations, and a beam direction of the terminal and a serving base station, such as at least one of the ZOA, ZOD, AOA or AOD, may be calculated according to the geographic location and location information of the serving base station, so that the beam information including but is not limited to a beam vector is acquired. For example, a DFT vector is acquired according to the beam direction, and the DFT vector corresponding to a beam direction A may be represented as $u1=[1, \exp(2*ph*d*\cos(A)/lambda), \ldots, \exp(2*pi*j*(N-1)*d*\cos(A)/lambda)]^T$. A is one of the ZOA, AOD, AOA or AOD, cos represents cosine or may be expressed in the form of sine, lambda represents a wavelength of electromagnetic waves, and d represents a spacing between antennas or elements. If the indicated beam direction has the ZOA or ZOD in a vertical direction, and the ZOA or ZOD in a horizontal direction, u1 obtained in the horizontal direction and u2 obtained in the vertical direction need to be subjected to the operation of the Kronecker product to obtain a DFT vector corresponding to a new beam is obtained by acquiring the Kronecker product of u1 obtained in the horizontal direction and u2 obtained in the vertical direction, such as Kronecker (u1, u2) or Kronecker (u2, u1).

When the location information is at least one of the ZOA, ZOD, AOA or AOD, the beam information may be directly generated according to at least one of the ZOA, ZOD, AOA or AOD.

When the location information is the geographic location, it is necessary to calculate the beam direction of the terminal and the serving base station, such as at least one of the ZOA, ZOD, AOA, or AOD, according to the geographic location and the location information of the serving base station, so as to generate the beam information.

When the location information is a speed or k-th order acceleration, a possible trajectory of a user may be predicted according to the speed or the acceleration, and a physical location of the terminal can be calculated according to the trajectory. Then, according to the geographic location and the location information of the serving base station, the beam direction of the terminal and the serving base station, such as at least one of the ZOA, ZOD, AOA or AOD, may be calculated, so as to generate the beam information.

In an exemplary implementation, the method of the embodiment may include steps described below. F pieces of channel state information are acquired according to at least one of the K pieces of location information or the N pieces of beam information. The F pieces of channel state information are fed back, where N and F are positive integers, and N and F are greater than or equal to K. Exemplarily, the channel state information may include at least one of: reference signal received power (RSRP), differential RSRP, channel state information-reference signal resource indicator (CRI), a synchronization signal block resource indicator (SSBRI), a precoding matrix indicator (PMI), a rank indicator (RI), a channel quality indicator (CQI), a layer indicator (LI), an L1-SINR or a differential L1-SINR. Herein, the number F of pieces of channel state information may be the same as or different from the number N of pieces of beam information.

Exemplarily, the step in which the F pieces of channel state information are acquired may include one of steps described below. For example, the beam information is acquired according to the location information, measurement resource information corresponding to beams is selected according to the beam information, and the CSI is acquired according to the measurement resource information. Alternatively, the beam direction is determined according to the beam information, precoding information is acquired according to the beam direction, and the CQI, the RI, the LI, the CRI and the like are calculated according to the precoding information. For example, measurement resource information corresponding to beams is selected according to the beam information, and the CSI is acquired according to the measurement resource information. Alternatively, the beam direction is determined according to the beam information, precoding information is acquired according to the beam direction, and the CQI, the RI, the LI and the like are calculated according to the precoding information.

In an exemplary implementation, a measurement time interval or a feedback time interval of the K pieces of location information is T1, T2, . . . , TK slots or symbols respectively. T1, T2, . . . , TK are positive integers and may have the same value. The measurement time interval or the feedback time interval may be determined by at least one of beam information or channel state information, or a measurement time or a feedback time of the K pieces of location information may be determined by at least one of the beam information or the channel state information. The feedback time interval of the K pieces of location information or a feedback frequency of the K pieces of location information or a feedback period of the K pieces of location information may be determined by the beam information or the channel state information. The K pieces of location information may be recalculated according to the variation of at least one of the CRI, RI, PMI or beam, so that the period variation or frequency variation of the CRI, RI, PMI or beam determines the period or frequency of the K pieces of location information. For example, a minimum value (an average value, a weighted average value, etc.) of the period or frequency of the change of the CRI, RI, PMI or beam is configured as an update frequency of the K pieces of location information. The update frequency of the K pieces of location information may determine the feedback period or the feedback time interval of the K pieces of location information. In addition, the value of K may be determined by the beam information or the channel state information, or may be at least one of a feedback time interval, a feedback occasion, a measurement time interval or a measurement occasion configured by the second communication node for the K pieces of location information. Alternatively, the terminal or the base station determines at least one of the measurement time interval, feedback time interval, measurement occasion or feedback occasion of the K pieces of location information according to real-time or statistical channel state information.

In an exemplary embodiment, two pieces of channel state information corresponding to adjacent two pieces of location information of the K pieces of location information may have a correlation. Exemplarily, the two pieces of channel state information having the correlation may include at least one of: indexes corresponding to the two pieces of channel state information being adjacent to each other (for example, two PMIs are adjacent to each other, two RIs are adjacent to each other, and two CQIs are adjacent to each other); or an absolute value of a difference between values corresponding to the two pieces of channel state information being less than a third threshold (for example, a difference between SINR1 and SINR2 corresponding to two CQIs is less than a third threshold a3, where a3 is a positive real number). Two CSIs have a correlation, so that differential feedback or reception may be used to reduce overhead.

In an exemplary embodiment, two pieces of beam information corresponding to adjacent two pieces of location information of the K pieces of location information have a correlation. Exemplarily, the two pieces of beam information having the correlation may include at least one of: beam indexes corresponding to the two pieces of beam information being adjacent to each other; angles corresponding to the two pieces of beam information being adjacent to each other; resource indexes corresponding to the two pieces of beam information being adjacent to each other; a vector correlation corresponding to the two pieces of beam information being greater than a first threshold; or a vector distance corresponding to the two pieces of beam information being less than a second threshold.

Angles being adjacent to each other refers to that an absolute value of a difference between two angles is less than a1, for example, |A−B|<a1; or, an absolute value of a difference between two angles modulo 2*pi is less than a1, for example, mod (|AB|, 2*pi)<a1, where A and B are two angles, a1 is a threshold, the unit of A, the unit of B and the unit of a1 are an angle or a radian at the same time, |A| represents the absolute value of A, mod (A, B) represents the operation of A modulo B.

Two vectors being adjacent to each other refers to that a distance or norm of the two vectors is less than a threshold a2, that is, $\|u1-u2\|<a2$, where u1 and u2 are two vectors or matrices, such as DFT vectors or codewords, and $\|u1\|$ represents a norm of the matrix u1 or vector u1. Two vectors being adjacent to each other may refers to that the correlation of the two vectors is greater than a threshold a3, that is, $\|u1^{H}*u2\|>a3$, where $u1^{H}$ represents the conjugate transpose of u1, and a2 and a3 are positive real numbers. The norm may be all norms defined in linear algebra, such as $l_1$ norm, $l_2$ norm, $l_p$ norm and so on.

In an exemplary embodiment, the F pieces of channel state information may be acquired according to F channel state information reference resources, where an (n1+k_i)-th slot corresponds to an i-th channel state information reference resource. That is, a channel measurement resource set and/or an interference measurement resource set earlier than an (n+k_i)-th slot and closest to the (n+k_i)-th slot is configured as an object to measure beam information corresponding to a k-th occasion and channel state information corresponding to the k-th occasion. An n1-th slot corresponds to a CSI reference resource corresponding to a first CSI report, n1 satisfies that n1=n−$n_{ref}$, n satisfies that $$n = \left\lfloor n' \cdot \frac{2^\mu DL}{2^\mu UL} \right\rfloor,$$

n' is a CSI reporting slot, $\mu_{DL}$ and $\mu_{UL}$ are respectively a uplink carrier spacing and a downlink carrier spacing, n, $n_{ref}$, k_i and F are positive integers, which satisfies that k_i<k_j, i<j, i and j=1, . . . , F, or i and j=0, . . . , F−1. $n_{ref}$ is a value determined according one of manners described below.

When the CSI report is a periodic or semi-persistent report and only one CSI-RS resource is configured for channel measurement, the value of $n_{ref}$ satisfies that n1=n−$n_{ref}$, and n1 is the smallest value of a valid downlink subframe and is greater than or equal to 4·$2^{\mu DL}$.

When the CSI report is a periodic or semi-persistent report and more than one CSI-RS resource is configured for channel measurement, the value of $n_{ref}$ satisfies that n1=n−$n_{ref}$, and n1 is the smallest value of a valid downlink subframe and is greater than or equal to 5·$2^{\mu DL}$.

When the CSI report is an aperiodic report, the value of $n_{ref}$ satisfies that (n−$n_{ref}$)-th slot triggers the CSI report; or, when the CSI report is an aperiodic report, n1=n−$n_{ref}$, and n1 is the smallest value of a valid downlink subframe and is greater than or equal to $\lfloor Z'/N_{symb}^{slot} \rfloor$, Z' represents a minimum delay requirement from the last symbol of the channel measurement resource to the first symbol carrying a CSI report resource, $N_{symb}^{slot}$ represents the number of symbols in a slot, and $\lfloor . \rfloor$ represents rounding down.

In the embodiment of the present application, the first communication node feeds back the location information (for example, location information of a future occasion after a current occasion) after the reference time to the second communication node, the second communication node is supported to utilize the location information after the reference time to acquire or predict more accurate channel state information. In this way, the performance of the wireless communication system is improved.

Figure 3:
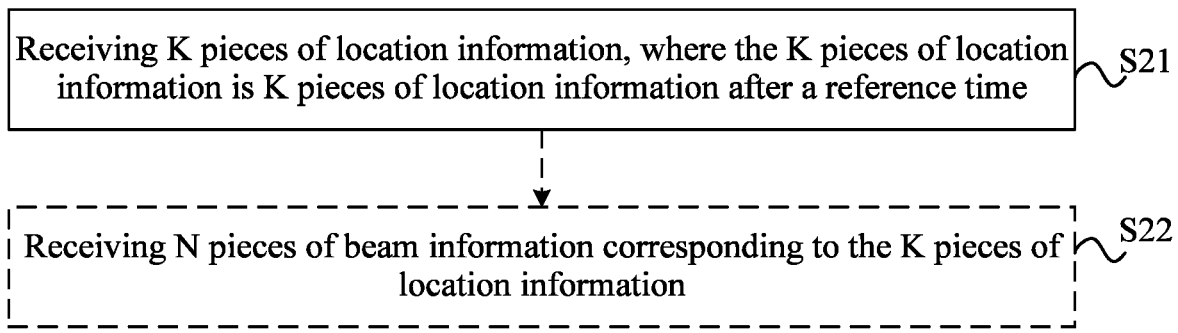
FIG. 3 is a flowchart of an information reception method according to an embodiment of the present application.

FIG. 3 is a flowchart of an information reception method according to an embodiment of the present application. The information reception method provided by the embodiment may be applied to the above second communication node side. As shown in FIG. 3, the information reception method provided by the embodiment includes steps described below.

In step S21, K pieces of location information are received, where the K pieces of location information is K pieces of location information after a reference time, and K is a positive integer.

In an exemplary implementation, step S21 may include the step described below. The base station receives K pieces of location information after a reference time fed back by the terminal.

In an exemplary implementation, the method of the embodiment may include the step described below. In step S22, N pieces of beam information corresponding to the K pieces of location information are received, where N is a positive integer, and N is greater than or equal to K. Exemplarily, the base station may receive N pieces of beam information fed back by the terminal. Exemplarily, the beam information may include at least one of: an angle of arrival (AOA), an angle of departure (AOD), a ZOD, a ZOA, a discrete Fourier transform (DFT) vector, a codeword in a codebook, a transmit beam, a receive beam, a transmit beam group, a receive beam group, a transmit beam index, a receive beam index, a transmit beam group index or a receive beam group index. In an example, the beam information is acquired by receiving at least one of following parameters on a physical uplink control channel or physical uplink shared channel of the terminal: a beam index, a beam group index, RSRP, differential RSRP, a differential L1-SINR, an L1-SINR, a ZOA, a ZOD, a AOA, a AOD, or an index of at least one of the ZOA, ZOD, AOA or AOD, an SSBRI or a CRI.

In an exemplary implementation, the method of the embodiment may further include the step described below. F pieces of channel state information are received, where the F pieces of channel state information are determined by at least one of the K pieces of location information or the N pieces of beam information, and F is a positive integer. In an example, the base station may receive F pieces of channel state information fed back by the terminal. Exemplarily, the channel state information may include at least one of: reference signal received power (RSRP), differential RSRP, channel state information-reference signal resource indicator (CRI), a synchronization signal block resource indicator (SSBRI), a precoding matrix indicator (PMI), a rank indicator (RI), a channel quality indicator (CQI), a layer indicator (LI), an L1-SINR or a differential L1-SINR.

In an exemplary implementation, a measurement time interval or a feedback time interval of the K pieces of location information is T1, T2, . . . , TK slots or symbols respectively. T1, T2, . . . , TK are positive integers and may have the same value. The measurement time interval or the feedback time interval may be determined by at least one of beam information or channel state information, or a measurement time or a feedback time of the K pieces of location information may be determined by at least one of the beam information or the channel state information. The feedback time interval of the K pieces of location information or a feedback frequency of the K pieces of location information or a feedback period of the K pieces of location information may be determined by the beam information or the channel state information. The K pieces of location information may be recalculated according to the change of at least one of the CRI, RI, PMI or beam. Therefore, the period or frequency of the change of the CRI, RI, PMI or beam determines the period or frequency of the K pieces of location information. For example, a minimum value (an average value, a weighted average value, etc.) of the period or frequency of the change of the CRI, RI, PMI or beam is configured as an update frequency of the K pieces of location information. The update frequency of the K pieces of location information may determine the feedback period or the feedback time interval of the K pieces of location information. In addition, the value of K may be determined by the beam information or the channel state information, or may be at least one of a feedback time interval, a feedback occasion, a measurement time interval or a measurement occasion configured by the second communication node for the K pieces of location information. Alternatively, the terminal or the base station determines at least one of the measurement time interval, feedback time interval, measurement occasion or feedback occasion of the K pieces of location information according to real-time or statistical channel state information.

In an exemplary embodiment, two pieces of channel state information corresponding to adjacent two pieces of location information of the K pieces of location information have a correlation. Exemplarily, the two pieces of channel state information having the correlation may include at least one of: indexes corresponding to the two pieces of channel state information being adjacent to each other; or an absolute value of a difference between values corresponding to the two pieces of channel state information being less than a third threshold.

In an exemplary embodiment, two pieces of beam information corresponding to adjacent two pieces of location information of the K pieces of location information have a correlation. Exemplarily, the two pieces of beam information having the correlation may include at least one of: beam indexes corresponding to the two pieces of beam information being adjacent to each other; angles corresponding to the two pieces of beam information being adjacent to each other; resource indexes corresponding to the two pieces of beam information being adjacent to each other; a vector correlation corresponding to the two pieces of beam information being greater than a first threshold; or a vector distance corresponding to the two pieces of beam information being less than a second threshold.

In an exemplary implementation, the value of K may be configured by the base station, or may be determined by the beam information or the channel state information.

In an exemplary implementation, the method of the embodiment may further include at least one of steps described below. L pieces of new channel state information are determined by using the K pieces of location information and the K pieces of channel state information, where K, L and F are positive integers; L pieces of new channel state information are determined by using the K pieces of location information, the N pieces of beam information and the F pieces of channel state information, where K, N, F and L are positive integers; or L pieces of new channel state information are determined by using the N pieces of beam information and the F pieces of channel state information, where N, F and L are positive integers. Exemplarily, the base station may determine L pieces of new channel state information according to the K pieces of location information and the F pieces of channel state information fed back by the terminal, and perform beam management and scheduling management according to the L pieces of new channel state information.

Some examples are described below. Geographic coordinates of the K pieces of location information are acquired through the K pieces of location information, and L pieces of new geographic location information are fitted through a deep learning algorithm of artificial intelligence according to the geographic coordinates. For example, a correlation between locations is researched through a linear fitting (or weighted fitting) method or a deep learning manner, so that L pieces of new geographic location information are obtained according to the correlation between the locations. Then, L pieces of beam information are acquired by using the L pieces of new geographic location information and the method of the above embodiment, and beams used for beam management in the future for a period of time are determined by using the L pieces of beam information and/or received N pieces of beam information. Alternatively, L new precoding matrices are acquired according to the L pieces of beam information and/or received N pieces of beam information. For example, a correlation between a vector corresponding to a same polarization direction antenna corresponding to the precoding matrices and a vector corresponding to the beam information is greater than a certain threshold, or a distance between a vector corresponding to a same polarization direction antenna corresponding to the precoding matrices and a vector corresponding to the beam information is less than a codeword of a threshold. The L new precoding matrices may be used to calculate new CQIs, RIs and other information, so that L pieces of new CSI and/or N pieces of received CSI are used for resource allocation and priority scheduling for the user.

For the description of the embodiment, reference may be made to the description of the embodiment corresponding to FIG. 2, which is not repeated herein.

In the embodiment of the present application, the second communication node may obtain or predict more accurate channel state information by using the location information after the reference time fed back by the first communication node, so that the performance of the wireless communication system is improved.

Figure 4:
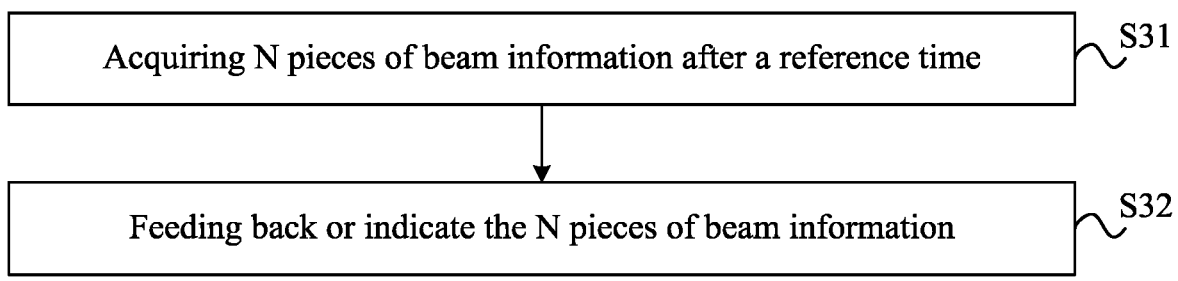
FIG. 4 is a flowchart of another information feedback method according to an embodiment of the present application.

FIG. 4 is a flowchart of another information feedback method according to an embodiment of the present application. The information feedback method provided by the embodiment may be applied to the above first communication node side. As shown in FIG. 4, the information feedback method provided by the embodiment includes steps described below.

In step S31, N pieces of beam information after a reference time are acquired.

In step S32, the N pieces of beam information are fed back or indicated, where N is a positive integer.

In an exemplary implementation, the terminal acquires N pieces of beam information after a reference time, and feed back the N pieces of beam information to the base station. Exemplarily, the beam information may include at least one of: an angle of arrival (AOA), an angle of departure (AOD), a ZOD, a ZOA, a discrete Fourier transform (DFT) vector, a codeword in a codebook, a transmit beam, a receive beam, a transmit beam group, a receive beam group, a transmit beam index, a receive beam index, a transmit beam group index or a receive beam group index.

In an exemplary embodiment, the N pieces of beam information may be acquired through K pieces of location information after the reference time.

In an exemplary implementation, the N pieces of beam information may be acquired through at least one of higher layer signaling or physical layer signaling.

An example is described below. Higher layer signaling RRC may include a TCI state list, which includes N0 TCI states. N4 TCI states in the N0 TCI states correspond to the value of one QCL type D, and each QCL type D corresponds to a transmit beam and/or a receive beam. Alternatively, the higher layer signaling may include an indicator of N0 QCL type Ds, where N0 satisfies that N0=N4, and each QCL type D corresponds to a transmit beam and/or a receive beam. N5 TCI states may be selected from N4 pieces of TCI signaling through the MAC CE for indication, or N5 TCI states may be selected from N4 TCI states through the MAC CE to form a TCI state set. The TCI state set includes at least N4 reference signals and N4 QCL Type values, where N0, N4 and N5 are positive integers, N5 is less than or equal to N4, and N4 is less than or equal to N0.

The N pieces of beam information may be acquired through a piece of physical layer signaling. The physical layer signaling includes one TCI field, each TCI field indicates N6 TCI states, N7 TCI states in the N6 TCI states correspond to the value of one QCL type D, and each QCL type D corresponds to a transmit beam and/or a receive beam, that is, one TCI indicates at least one TCI state, and each TCI state corresponds to one or two reference signals and the value of a QCL type. Alternatively, the N pieces of beam information may be acquired through multiple pieces of physical layer signaling. Each piece of physical layer signaling includes a TCI field, each TCI field indicates a TCI state, and each TCI state corresponds to one or two reference signals and the value of a QCL type. N6 is greater than or equal to N7, and N7 is greater than N.

In an exemplary implementation, the method of the embodiment may include the step described below. F pieces of channel state information corresponding to the N pieces of beam information are acquired, and the F pieces of channel state information are fed back, where F is a positive integer.

In an exemplary implementation, the F pieces of channel state information are acquired according to F channel state information reference resources. Exemplarily, an (n1+k_i)-th slot corresponds to an i-th channel state information reference resource, and an n1-th slot corresponds to a channel state information reference resource corresponding to the first CSI report. n1 satisfies that n1=n-n_{ref}, n satisfies that $$n = \left\lfloor n' \cdot \frac{2^\mu DL}{2^\mu UL} \right\rfloor,$$

n' is a CSI reporting slot, $\mu_{DL}$ and $\mu_{UL}$ are respectively a uplink carrier spacing and a downlink carrier spacing, n, $n_{ref}$, k_i and F are positive integers, k_i is less than or equal to k_j, i is less than j, each of i and j is a positive integer being greater than 0 and being less than or equal to F, or each of i and j is a positive integer being greater than or equal to 0 and being less than or equal to F−1. Values of all indexes may start from 0 and end at O−1, where O is the number of resources corresponding to corresponding indexes.

In an exemplary implementation, the method of the embodiment may include the step described below. A value of N and values of the N pieces of beam information are determined. Exemplarily, the method of the embodiment may include the step described below. A value of N or a use occasion of the N pieces of beam information is fed back.

In an embodiment, when the N pieces of beam information are transmit beams of the terminal, the number of beams and/or s transmit occasion of the N pieces of beam information may be determined by the terminal. Exemplarily, the terminal may feed back the value of N and/or information of the transmit occasion of the N pieces of beam information through a physical uplink control channel or a physical uplink shared channel.

Figure 5:
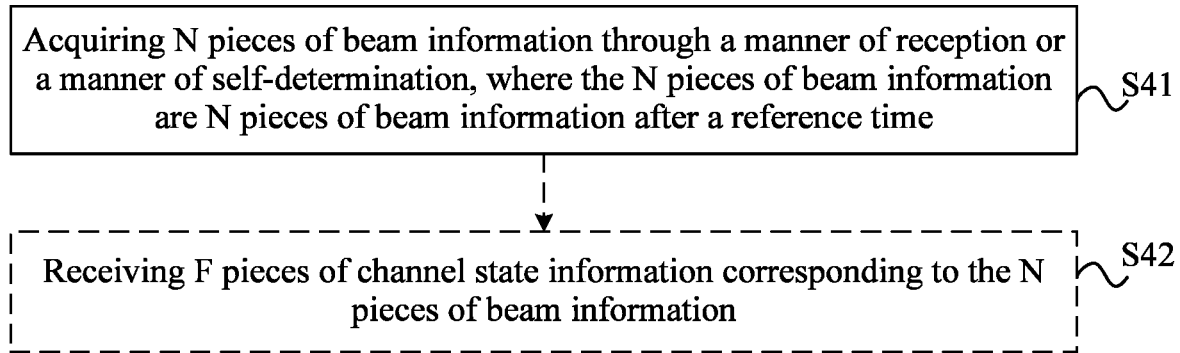
FIG. 5 is a flowchart of an information acquisition method according to an embodiment of the present application.

FIG. 5 is a flowchart of an information acquisition method according to an embodiment of the present application. The information acquisition method provided by the embodiment may be applied to the above second communication node side. As shown in FIG. 5, the information acquisition method provided by the embodiment includes steps described below.

In step S41, N pieces of beam information are acquired through a manner of reception or a manner of self-determination, where the N pieces of beam information are N pieces of beam information after a reference time, and N is a positive integer.

In an exemplary implementation, the base station may receive N pieces of beam information after a reference time fed back by the terminal; or, the base station may determine N pieces of beam information after a reference time by the base station itself. Exemplarily, the beam information may include at least one of: an angle of arrival (AOA), an angle of departure (AOD), a ZOD, a ZOA, a discrete Fourier transform (DFT) vector, a codeword in a codebook, a transmit beam, a receive beam, a transmit beam group, a receive beam group, a transmit beam index, a receive beam index, a transmit beam group index or a receive beam group index.

In an exemplary implementation, the method of the embodiment may include the step described below. In step S42, F pieces of channel state information corresponding to the N pieces of beam information are received, where F is a positive integer. Exemplarily, the channel state information may include at least one of: reference signal received power (RSRP), differential RSRP, channel state information-reference signal resource indicator (CRI), a synchronization signal block resource indicator (SSBRI), a precoding matrix indicator (PMI), a rank indicator (RI), a channel quality indicator (CQI), a layer indicator (LI), an L1-SINR or a differential L1-SINR.

In an exemplary implementation, the F pieces of channel state information are acquired according to F channel state information reference resources. Exemplarily, an (n1+k_i)-th slot corresponds to an i-th channel state information reference resource, and an n1-th slot corresponds to a channel state information reference resource corresponding to the first CSI report. n1 and k_i are positive integers, k_i is less than or equal to k_j, i is less than j, each of i and j is a positive integer being greater than 0 and being less than or equal to F, or each of i and j is a positive integer being greater than or equal to 0 and being less than or equal to F−1.

In an exemplary implementation, the method of the embodiment may further include the step described below. A value of N or a use occasion of the N pieces of beam information are acquired, and the value of N and values of the N pieces of beam information are determined according to the received value of N or the received use occasion of the N pieces of beam information.

In an exemplary implementation, the method of the embodiment may include the step described below. The N pieces of beam information may be indicated through at least one of higher layer signaling or physical layer signaling. An example is described below. Higher layer signaling RRC may include a TCI state list, which includes N0 TCI states. N4 TCI states in the N0 TCI states correspond to the value of one QCL type D, and each QCL type D corresponds to a transmit beam and/or a receive beam. Alternatively, the higher layer signaling may include an indicator of N0 QCL type Ds, where N0 satisfies that N0=N4, and each QCL type D corresponds to a transmit beam and/or a receive beam. N5 TCI states may be selected from N4 pieces of TCI signaling through the MAC CE for indication, or N5 TCI states may be selected from N4 TCI states through the MAC CE to form a TCI state set. The TCI state set includes at least N4 reference signals and N4 QCL Type values, where N0, N4 and N5 are positive integers, N5 is less than or equal to N4, and N4 is less than or equal to N0.

The N pieces of beam information may be indicated through a piece of physical layer signaling. The physical layer signaling includes one TCI field, each TCI field indicates N6 TCI states, N7 TCI states in the N6 TCI states correspond to the value of one QCL type D, and each QCL type D corresponds to a transmit beam and/or a receive beam, that is, one TCI indicates at least one TCI state, and each TCI state corresponds to one or two reference signals and the value of a QCL type. Alternatively, the N pieces of beam information may be indicated through multiple pieces of physical layer signaling. Each piece of physical layer signaling includes a TCI field, each TCI field indicates a TCI state, and each TCI state corresponds to one or two reference signals and the value of a QCL type. N6 is greater than or equal to N7, and N7 is greater than N.

For the description of the embodiment, reference may be made to the description of the embodiment corresponding to FIG. 4, which is not repeated herein.

Embodiment One

Figure 6:
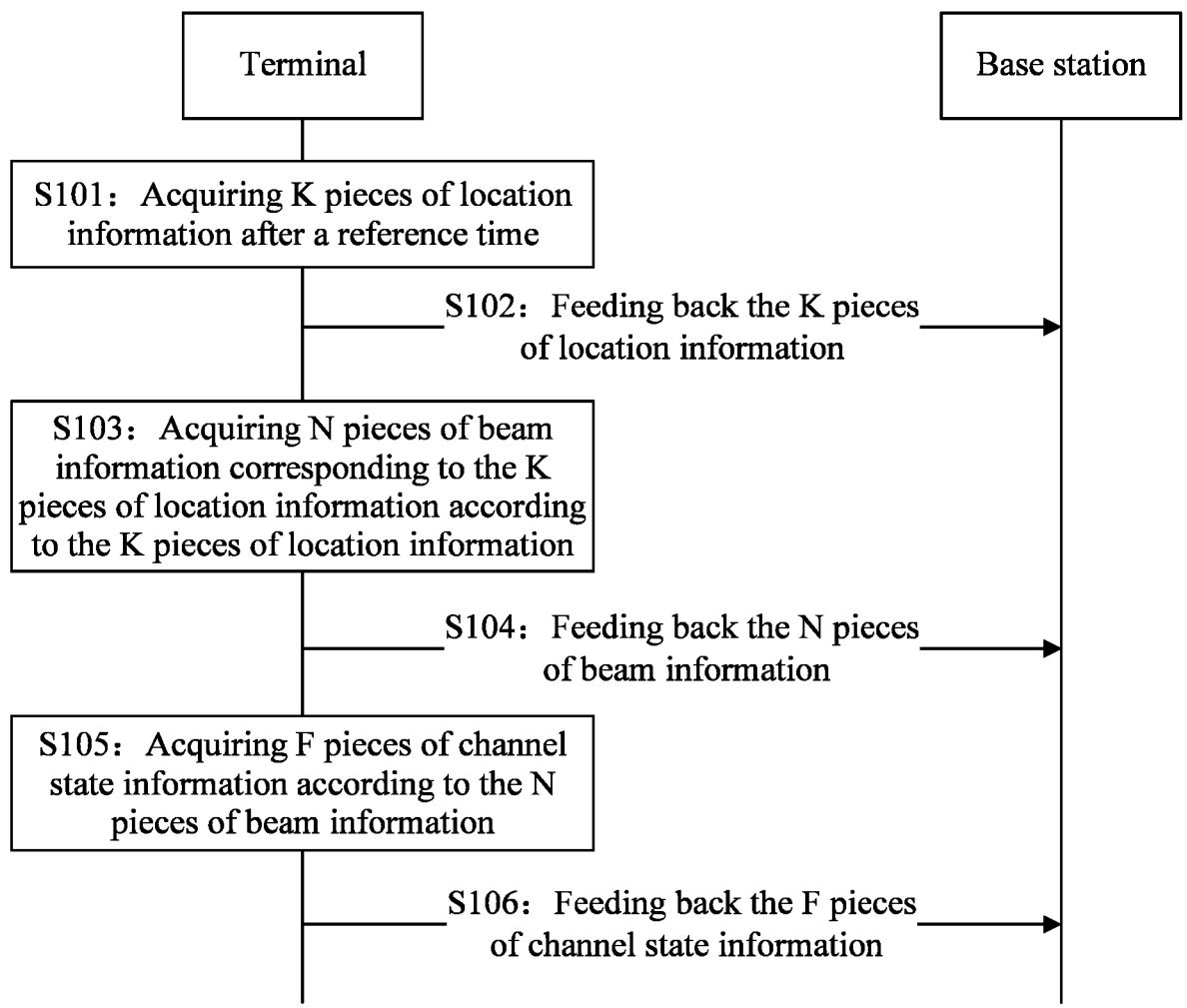
FIG. 6 is a diagram showing an exemplary implementation of an information feedback method according to an embodiment of the present disclosure.

FIG. 6 is a diagram showing an exemplary implementation of an information feedback method according to an embodiment of the present disclosure. The exemplary embodiment is applied in a system including at least one terminal (or user) and a base station, and the base station and the terminal in the system may both have more than one port or antenna. As shown in FIG. 6, the exemplary embodiment includes steps described below.

In step S101, K pieces of location information after a reference time are acquired, where K is an integer greater than or equal to 1.

The K pieces of location information after the reference time may refer to K pieces of location information corresponding to K future occasions after a current occasion.

The location information may include, but is not limited to, at least one of: a reference signal time difference (RSTD), a relative time of arrival (RTOA), an angle of arrival (AOA), an angle of departure (AOD), a ZOD, a ZOA, an Rx-Tx time difference, Cartesian coordinates (x, y, z) reflecting physical locations, polar coordinates (r, a, b), a movement speed, a direction of the movement speed, movement acceleration, a direction of the movement acceleration, k-th order acceleration or a direction of the k-th order acceleration. The k-th order (k=1) acceleration represents the acceleration, and is a derivative of the movement speed. (k+1)-th order acceleration represents a derivative of the k-th order acceleration. k satisfies that k=1, . . . K1. K1 is an integer greater than or equal to 1, and the value of K1 may be configured by the second communication node or agreed by the first communication node and the second communication node. x, y, z are real numbers, r is a positive real number, and a and b are a horizontal angle and a vertical angle.

In an example, the terminal may predict location information of L future occasions by using the deep learning technology of artificial intelligence. For example, a possible movement trajectory of a user may be predicted according to K pieces of location information, and L pieces of new geographic location information are fitted through linear average or linear weighted average or other manners; or, a possible motion trajectory of a user may also be predicted through the learning manner of artificial intelligence, and L pieces of new location information are acquired according to the motion trajectory in combination with actual map information.

In step S102, the terminal feeds back the K pieces of location information to the base station.

In an example, the terminal may execute step S103 and step S104.

In step S103, the terminal acquires N pieces of beam information corresponding to the K pieces of location information according to the K pieces of location information. N is a positive integer, and N is greater than or equal to K.

The beam information may include at least one of: an angle of arrival (AOA), an angle of departure (AOD), a ZOD, a ZOA, a discrete Fourier transform (DFT) vector, a codeword in a codebook, a transmit beam, a receive beam, a transmit beam group, a receive beam group, a transmit beam index, a receive beam index, a transmit beam group index or a receive beam group index.

In an example, the terminal may feed back RSRP, a SINR, differential RSRP and a differential SINR corresponding to the N pieces of beam information.

Exemplarily, the N pieces of beam information may be adjacent beams. For example, indexes corresponding to two beams (an i-th beam and an (i+1)-th beam) are adjacent to each other, or angles corresponding to two beams are adjacent to each other, or resource indexes corresponding to two beams are adjacent to each other, or a vector correlation corresponding to two beams is greater than a threshold c1, or a vector distance corresponding to two beams is less than a threshold c2. c1 and c2 are real numbers greater than 0 and less than 1.

The beams are adjacent to each other, so that the feedback overhead may be reduced based on one of feedback manners described below.

RSRP corresponding to the first beam and a differential value of RSRP corresponding to other beams except the first beam relative to the RSRP corresponding to the first beam (differential RSRP) are fed back.

A SINR corresponding to the first beam and a differential value of SINRs corresponding to other beams except the first beam relative to the SINR corresponding to the first beam (a differential SINR) are fed back.

One beam information index and N−1 differential indexes relative to the one beam information index are fed back or indicated. The beam information index includes at least one of: a CRI, an SSBRI, a beam identifier (ID), a beam group ID, an index corresponding to an AOA, an index corresponding to an AOD, an index corresponding to a ZOA, an index corresponding to an AOD or a TCI state index. For example, the first beam index and a differential value of N−1 indexes corresponding to other beam information except the first piece of beam information relative to an index corresponding to the first piece of beam information (a differential index) are fed back or indicated N beam information index sets are fed back or indicated. The beam information index sets include at least one of sets of indexes: CRIs, SSBRIs, beam IDs, beam group IDs, indexes corresponding to AOAs, indexes corresponding to AODs, indexes corresponding to ZOAs, indexes corresponding to AODs or TCI state indexes. Beam information indexes included in an i-th beam information index set in the N beam information index sets and beam information index included in an (i+1)-th beam information index set in the N beam information index sets have at least one same beam information index, and i=1, . . . , N.

In step S104, the terminal feeds back the N pieces of beam information to the base station.

In an example, the terminal may execute step S105 and step S106.

In step S105, the terminal acquires F pieces of channel state information according to the N pieces of beam information. The channel state information may include at least one of following parameters: an RI, a CRI, a PMI, a LI or a CQI.

Since the N pieces of beam information are adjacent to each other, the F pieces of channel state information have a certain correlation. For example, the F pieces of channel state information may have at least one of following correlations: a precoding distance corresponding to two PMIs being less than a threshold a1, a precoding correlation corresponding to two PMIs being greater than a certain threshold a2, an absolute value of an index difference corresponding to two RIs being less than a threshold a3, or an absolute value of an index difference corresponding to two CQIs being less than a threshold a4, where a1, a2, a3 and a4 are positive real numbers.

In step S106, the terminal feeds back the F pieces of channel state information to the base station.

The above sequence of steps is not limited by the embodiments of the present application. For example, the terminal may feed back the location information and the beam information together after acquiring the location information and the corresponding beam information. Alternatively, the terminal may feed back the location information, the corresponding beam information and the channel state information together after acquiring the location information, the corresponding beam information and the channel state information.

Embodiment Two

Figure 7:
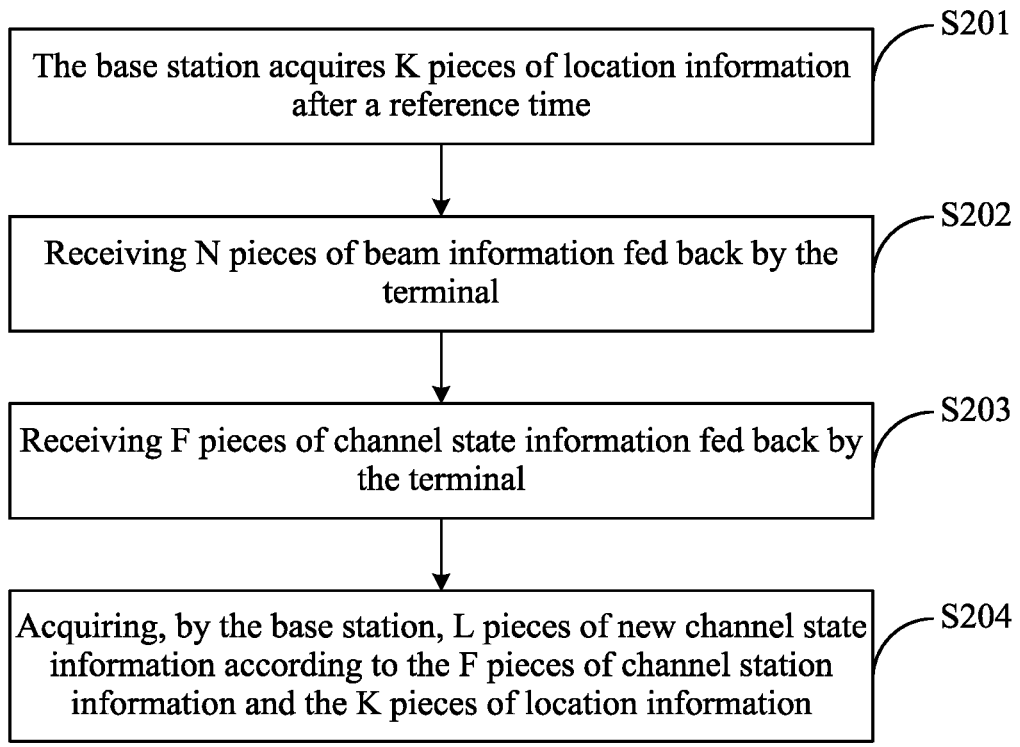
FIG. 7 is a diagram showing another exemplary implementation of an information feedback method according to an embodiment of the present disclosure.

FIG. 7 is a diagram showing another exemplary implementation of an information feedback method according to an embodiment of the present disclosure. The exemplary embodiment is applied in a system including at least one terminal (or user) and a base station, and the base station and the terminal in the system may both have more than one port or antenna. As shown in FIG. 7, the exemplary embodiment includes steps described below.

In step S201, the base station acquires K pieces of location information after a reference time, where K is a positive integer.

The base station may acquire the K pieces of location information by receiving the K pieces of location information fed back by the terminal, or may acquire the K pieces of location information itself through uplink channel information.

The K pieces of location information after the reference time may refer to K pieces of location information corresponding to K future occasions after a current occasion.

The location information includes, but is not limited to, at least one of: a reference signal time difference (RSTD), a relative time of arrival (RTOA), an angle of arrival (AOA), an angle of departure (AOD), a ZOD, a ZOA, an Rx-Tx time difference, Cartesian coordinates (x, y, z) reflecting physical locations, polar coordinates (r, a, b), a movement speed, a direction of the movement speed, movement acceleration, a direction of the movement acceleration, k-th order acceleration or a direction of the k-th order acceleration. The k-th order (k=1) acceleration represents the acceleration, and is a derivative of the movement speed. (k+1)-th order acceleration represents a derivative of the k-th order acceleration. k satisfies that k=1, . . . K. K is an integer greater than or equal to 1, and the value of K may be configured by the second communication node or agreed by the first communication node and the second communication node. x, y, z are real numbers, r is a positive real number, and a and b are a horizontal angle and a vertical angle.

In an example, the terminal predicts location information of L future occasions by using the deep learning technology of artificial intelligence. For example, a possible movement trajectory of a user may be acquired according to K pieces of location information, and L pieces of new geographic location information are fitted through linear average or linear weighted average or other manners; or, a possible motion trajectory of a user may also be predicted through the learning manner of artificial intelligence, and L pieces of new location information are acquired according to the motion trajectory in combination with actual map information; or, L pieces of new location information of a user are predicted through K movement speeds and/or K pieces of k-th order acceleration.

In an example, the base station may further execute step S202.

In step S202, the base station receives N pieces of beam information fed back by the terminal. N is a positive integer, and N is greater than or equal to K.

The beam information may include at least one of: an angle of arrival (AOA), an angle of departure (AOD), a ZOD, a ZOA, a discrete Fourier transform (DFT) vector, a codeword in a codebook, a transmit beam, a receive beam, a transmit beam group, a receive beam group, a transmit beam index, a receive beam index, a transmit beam group index or a receive beam group index.

Exemplarily, the base station may receive RSRP, an SINR, differential RSRP and a differential SINR corresponding to the N pieces of beam information fed back by the terminal.

Exemplarily, the N pieces of beam information are adjacent beams. For example, indexes corresponding to two beams (an i-th beam and an (i+1)-th beam) are adjacent to each other, or angles corresponding to two beams are adjacent to each other, or resource indexes corresponding to two beams are adjacent to each other, or a vector correlation corresponding to two beams is greater than a threshold c1, or a vector distance corresponding to two beams is less than a threshold c2. c1 and c2 are real numbers greater than 0 and less than 1.

The beams are adjacent to each other, so that the signaling overhead may be reduced based on one of reception manners described below.

RSRP corresponding to the first beam and a differential value of RSRP corresponding to other beams except the first beam relative to the RSRP corresponding to the first beam (differential RSRP) are received.

A SINR corresponding to the first beam and a differential value of SINRs corresponding to other beams except the first beam relative to the SINR corresponding to the first beam (a differential SINR) are fed back.

An index corresponding to the first beam and a differential value of indexes corresponding to other beams except the first beam relative to the index corresponding to the first beam (a differential index) are fed back. The index includes at least one of: a CRI, an SSBRI, a beam ID, a beam group ID, an index corresponding to an AOA, an index corresponding to an AOD, an index corresponding to a ZOA or an index corresponding to an AOD.

In an example, the base station may further execute step S203.

In step S203, the base station receives F pieces of channel state information fed back by the terminal.

The channel state information may include at least one of following parameters: an RI, a CRI, a PMI, a LI or a CQI.

Since the N pieces of beam information are adjacent to each other, the F pieces of channel state information have a certain correlation. For example, the F pieces of channel state information may have at least one of following correlations: a precoding distance corresponding to two PMIs being less than a threshold a1, a precoding correlation corresponding to two PMIs being greater than a certain threshold a2, an absolute value of an index difference corresponding to two RIs being less than a threshold a3, or an absolute value of an index difference corresponding to two CQIs being less than a threshold a4, where a1, a2, a3 and a4 are positive real numbers.

In step S204, the base station acquires L pieces of new channel state information according to the F pieces of channel station information and the K pieces of location information. N, K, F and L are integers greater than or equal to 1.

For example, a possible future motion trajectory of a UE is predicted through the location information, so that L pieces of future location information are acquired. L pieces of direction information of the base station and the terminal are determined through the L pieces of location information, so that L new precoding matrices and L new CRIs and L new CQIs are fitted according to the L pieces of direction information.

The base station may use the L pieces of new channel state information to perform resource scheduling and beam management on the terminal.

Some examples are described below. Geographic coordinates of the K pieces of location information are acquired through the K pieces of location information, and L pieces of new geographic location information are fitted through a deep learning algorithm of artificial intelligence according to the geographic coordinates. For example, a correlation between locations is researched through a linear fitting (or weighted fitting) method or a deep learning manner, so that L new geographic locations are obtained according to the correlation between the locations. Then, L pieces of beam information are acquired by using L pieces of new geographic location information and the method of the above embodiment, and beams used for beam management in the future for a period of time are determined by using the L pieces of beam information and/or received N pieces of beam information. Alternatively, L new precoding matrices are acquired according to the L pieces of beam information and/or received N pieces of beam information. For example, a correlation between a vector corresponding to a same polarization direction antenna corresponding to the precoding matrices and a vector corresponding to the beam information is greater than a certain threshold, or a distance between a vector corresponding to a same polarization direction antenna corresponding to the precoding matrices and a vector corresponding to the beam information is less than a codeword of a threshold. The L new precoding matrices may be used to calculate new CQIs, RIs and other information, so that L pieces of new CSI and/or N pieces of received CSI are used for resource allocation and priority scheduling for the user. In an application scenario, for example, for a user moving on a highway or a railway, the motion trajectory is almost straight, so that as long as a movement speed and/or acceleration are known, location information of K occasions can be inferred. Thus, beam direction information of the base station and the terminal can be determined according to the location information, and CSI can be determined according to the beam direction information.

Embodiment Three

The exemplary embodiment is applied in a system including at least one terminal (or user) and a base station, and the base station and the terminal in the system may both have more than one port or antenna. In the embodiment, the terminal may improve the performance of the system through methods described below.

In step S301, the terminal acquires N pieces of beam information after a reference time.

The N pieces of beam information after the reference time may refer to N pieces of beam information corresponding to K future occasions after a current occasion, where K and N are both positive integers, and N is greater than or equal to K.

Exemplarily, the terminal may feed back RSRP, an SINR, differential RSRP and a differential SINR corresponding to the N pieces of beam information to the base station.

Exemplarily, the N pieces of beam information are adjacent beams.

Exemplarily, the terminal may determine the N pieces of beam information through downlink channel information.

Exemplarily, the terminal may acquire the N pieces of beam information by receiving at least one of higher layer signaling or physical layer signaling of the base station. An example is described below. Higher layer signaling RRC may include a TCI state list, which includes N0 TCI states. N4 TCI states in the N0 TCI states correspond to the value of one QCL type D, and each QCL type D corresponds to a transmit beam and/or a receive beam. Alternatively, the higher layer signaling may include an indicator of N0 QCL type Ds, where N0 satisfies that N0=N4, and each QCL type D corresponds to a transmit beam and/or a receive beam. N5 TCI states may be selected from N4 pieces of TCI signaling through the MAC CE for indication, or N5 TCI states may be selected from N4 TCI states through the MAC CE to form a TCI state set. The TCI state set includes at least N4 reference signals and N4 QCL Type values, where N0, N4 and N5 are positive integers, N5 is less than or equal to N4, and N4 is less than or equal to N0.

The terminal may acquire the N pieces of beam information by receiving a piece of physical layer signaling. The physical layer signaling includes one TCI field, each TCI field indicates N6 TCI states, N7 TCI states in the N6 TCI states correspond to the value of one QCL type D, and each QCL type D corresponds to a transmit beam and/or a receive beam, that is, one TCI indicates at least one TCI state, and each TCI state corresponds to one or two reference signals and the value of a QCL type. Alternatively, the terminal may acquire the N pieces of beam information by receiving multiple pieces of physical layer signaling. Each piece of physical layer signaling includes a TCI field, each TCI field indicates a TCI state, and each TCI state corresponds to one or two reference signals and the value of a QCL type. N6 is greater than or equal to N7, and N7 is greater than N.

In step S302, the terminal transmits data or signals by using N pieces of beam information.

The data may include a physical uplink shared channel, and the signals may include a SRS, a demodulation reference signal and so on.

In the embodiment, the terminal transmits data or signals by using one beam of N beams at one occasion in a manner agreed with the base station. For example, according to an index sorting of the N beams, data or signals are transmitted by using an i-th beam at an (i+k*N)-th occasion after the current occasion by polling. For example, according to a RSRP sorting of the N beams, data or signals are transmitted by using an i-th beam at an (i+k*N)-th occasion after the current occasion by polling. For example, according to a SINR sorting of the N beams, data or signals are transmitted by using an i-th beam at an (i+k*N)-th occasion after the current occasion by polling. i=1, . . . , N, and k is an integer greater than or equal to 0. Alternatively, the terminal feeds back a use time of the N beams and/or a value of N determined by the terminal through a physical uplink shared channel or a physical uplink control channel.

In the embodiment, on the base station side, the base station may receive or transmit data information or signals through manners described below.

In step S303, the base station acquires the N pieces of beam information.

Exemplarily, the base station may indicate the N pieces of beam information through at least one of higher layer signaling or physical layer signaling.

In the embodiment, the terminal may transmit data or signals by using one beam of the N beams at one occasion in a manner agreed with the base station. For example, according to an index sorting of the N beams, data or signals are transmitted by using an i-th beam at an (i+k*N)-th occasion after the current occasion by polling. For example, according to a RSRP sorting of the N beams, data or signals are transmitted by using an i-th beam at an (i+k*N)-th occasion after the current occasion by polling. For example, according to a SINR sorting of the N beams, data or signals are transmitted by using an i-th beam at an (i+k*N)-th occasion after the current occasion by polling. i=1, ..., N, and k is an integer greater than or equal to 0. Alternatively, the base station receives a use time of the N beams and/or a value of N fed back through a physical uplink shared channel or a physical uplink control channel.

In step S304, the base station receives data or signals by using reception beam information corresponding to the N pieces of beam information.

The data includes a physical uplink shared channel, and the signals include a SRS, a DMRS and so on.

Embodiment Four

The exemplary embodiment is applied in a system including at least one terminal (or user) and a base station, and the base station and the terminal in the system may both have more than one port or antenna. In the embodiment, F pieces of channel state information are acquired according to F channel state information reference resources. An (n1+k_1)-th slot, an (n1+k_2)-th slot, an (n1+k_3)-th slot, ..., an (n1+k_F)-th slot correspond to the F channel state information reference resources. n1, k_1, k_1, k_1, ... k_F are positive integers, and k_1≤k_2≤k_3≤ ... ≤k_F. An n1-th slot corresponds to a CSI reference resource corresponding to the first CSI report, n1 satisfies that n1=n−n$_{ref}$, n satisfies that $$n = \left\lfloor n' \cdot \frac{2^\mu DL}{2^\mu UL} \right\rfloor,$$

n' is a CSI reporting slot, $\mu_{DL}$ and $\mu_{UL}$ are respectively a uplink carrier spacing and a downlink carrier spacing, n, n$_{ref}$, k_i and F are positive integers, k_i≤k_j, i<j, i and j= 1, ..., F, or i and j=0, ..., F−1. n$_{ref}$ is a value determined according one of manners described below.

When the CSI report is a periodic or semi-persistent report and only one CSI-RS resource is configured for channel measurement, the value of n$_{ref}$ satisfies that n1=n− n$_{ref}$, and n1 is the smallest value of a valid downlink subframe and is greater than or equal to $4 \cdot 2^{\mu_{DL}}$.

When the CSI report is a periodic or semi-persistent report and more than one CSI-RS resource is configured for channel measurement, the value of n$_{ref}$ satisfies that n1=n− n$_{ref}$, and n1 is the smallest value of a valid downlink subframe and is greater than or equal to $5 \cdot 2^{\mu_{DL}}$.

When the CSI report is an aperiodic report, the value of n$_{ref}$ satisfies that (n−n$_{ref}$)-th slot triggers the CSI report; or, when the CSI report is an aperiodic report, n1=n−n$_{ref}$, and n1 is the smallest value of a valid downlink subframe and is greater than or equal to $\lfloor Z'/N_{symb}^{slot} \rfloor$. Z' represents a minimum delay requirement from the last symbol of the channel measurement resource to the first symbol carrying a CSI report resource, $N_{symb}^{slot}$ represents the number of symbols in a slot, and $\lfloor \cdot \rfloor$ represents rounding down.

Figure 8:
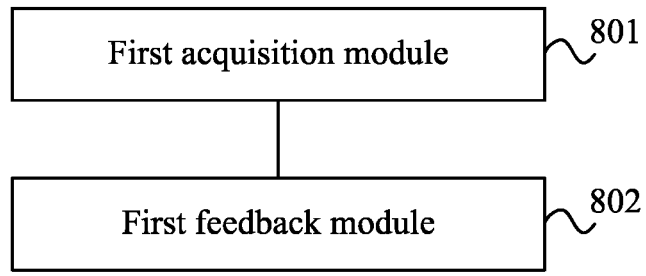
FIG. 8 is a schematic diagram of an information feedback apparatus according to an embodiment of the present application.

FIG. 8 is a diagram showing an information feedback apparatus according to an embodiment of the present application. As shown in FIG. 8, the information feedback apparatus provided by the embodiment may be applied to the first communication node (such as a terminal device). The apparatus includes a first acquisition module 801 and a first feedback module 802. The first acquisition module 801 is configured to acquire K pieces of location information after a reference time. The first feedback module 802 is configured to feed back the K pieces of location information. K is a positive integer.

In an exemplary implementation, the first acquisition module 801 is further configured to acquire N pieces of beam information corresponding to the K pieces of location information. The first feedback module 802 is further configured to feed back or indicate the N pieces of beam information. N is a positive integer, and N is greater than or equal to K.

In an exemplary implementation, the first acquisition module 801 is further configured to acquire F pieces of channel state information according to at least one of the K pieces of location information or the N pieces of beam information. The first feedback module 802 is further configured to feed back the F pieces of channel state information. N and F are positive integers, and N and F are greater than or equal to K.

In an exemplary implementation, at least one of a feedback time interval, a measurement time interval, a feedback time or a measurement time of the K pieces of location information is determined by at least one of beam information or channel state information.

In an exemplary embodiment, two pieces of channel state information corresponding to adjacent two pieces of location information of the K pieces of location information have a correlation.

In an exemplary embodiment, two pieces of beam information corresponding to adjacent two pieces of location information of the K pieces of location information have a correlation. Exemplarily, the two pieces of beam information having the correlation may include at least one of: beam indexes corresponding to the two pieces of beam information being adjacent to each other; angles corresponding to the two pieces of beam information being adjacent to each other; resource indexes corresponding to the two pieces of beam information being adjacent to each other; a vector correlation corresponding to the two pieces of beam information being greater than a first threshold; or a vector distance corresponding to the two pieces of beam information being less than a second threshold.

For the related description of the information feedback apparatus provided by the embodiment, reference may be made to the embodiment of the information feedback method of the first communication node side shown in FIG. 2, which is not repeated herein.

Figure 9:
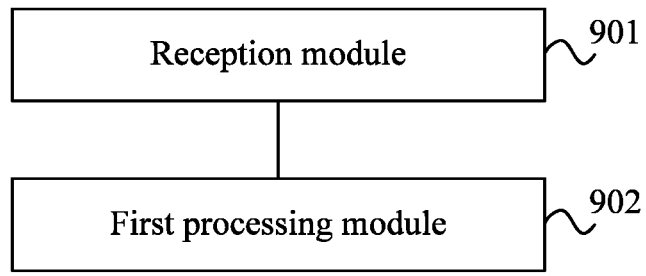
FIG. 9 is a schematic diagram of an information reception apparatus according to an embodiment of the present application.

FIG. 9 is a diagram showing an information reception apparatus according to an embodiment of the present application. As shown in FIG. 9, the information reception apparatus provided by the embodiment is applied to the second communication node (such as a base station) and includes a reception module 901. The reception module 901 is configured to receive K pieces of location information, where the K pieces of location information is K pieces of location information after a reference time, and K is a positive integer.

In an exemplary implementation, the reception module 901 is further configured to receive N pieces of beam information corresponding to the K pieces of location information, where N is a positive integer, and N is greater than or equal to K.

In an exemplary implementation, the reception module 901 is further configured to receive F pieces of channel state information, where the F pieces of channel state information are determined by at least one of the K pieces of location information or the N pieces of beam information, and F is a positive integer.

In an exemplary implementation, a reception time interval of the K pieces of location information is determined by at least one of beam information or channel station information.

In an exemplary embodiment, two pieces of channel state information corresponding to adjacent two pieces of location information of the K pieces of location information have a correlation.

In an exemplary embodiment, two pieces of beam information corresponding to adjacent two pieces of location information of the K pieces of location information have a correlation. Exemplarily, the two pieces of beam information having the correlation may include at least one of: beam indexes corresponding to the two pieces of beam information being adjacent to each other; angles corresponding to the two pieces of beam information being adjacent to each other; resource indexes corresponding to the two pieces of beam information being adjacent to each other; a vector correlation corresponding to the two pieces of beam information being greater than a first threshold; or a vector distance corresponding to the two pieces of beam information being less than a second threshold.

In an exemplary implementation, the information reception apparatus of the embodiment may further include a first processing module 902. The first processing module 902 is configured to execute at least one of: determining L pieces of new channel state information by using the K pieces of location information and the F pieces of channel state information, where K, N, F and L are positive integers; determining L pieces of new channel state information by using the K pieces of location information, the N pieces of beam information and the F pieces of channel state information, where K, N, F and L are positive integers; or determining L pieces of new channel state information by using the N pieces of beam information and the F pieces of channel state information, where N, F and L are positive integers.

For the related description of the information reception apparatus provided by the embodiment, reference may be made to the embodiment of the information reception method of the second communication node side, which is not repeated herein.

Figure 10:
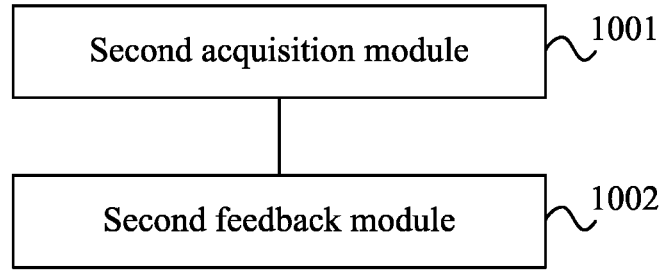
FIG. 10 is a schematic diagram of another information feedback apparatus according to an embodiment of the present application.

FIG. 10 is a diagram showing another information feedback apparatus according to an embodiment of the present application. As shown in FIG. 10, the information feedback apparatus provided by the embodiment may be applied to the first communication node (such as a terminal device). The apparatus includes a second acquisition module 1001 and a second feedback module 1002. The second acquisition module 1001 is configured to acquire N pieces of beam information after a reference time. The second feedback module 1002 is configured to feed back or indicate the N pieces of beam information. N is a positive integer.

In an exemplary embodiment, the N pieces of beam information are acquired through K pieces of location information after a reference time.

In an exemplary implementation, the N pieces of beam information are acquired through at least one of higher layer signaling or physical layer signaling.

In an exemplary implementation, the second acquisition module 1001 is further configured to acquire F pieces of channel station information corresponding to the N pieces of beam information. The second feedback module 1002 is further configured to feed back the F pieces of channel state information.

In an exemplary implementation, the F pieces of channel state information are acquired according to F channel state information reference resources. An (n1+k_i)-th slot corresponds to an i-th channel state information reference resource, and an n1-th slot corresponds to a channel state information reference resource corresponding to the first CSI report. n1 and k_i are positive integers, k_i is less than or equal to k_j, i is less than j, each of i and j is a positive integer being greater than 0 and being less than or equal to F, or each of i and j is a positive integer being greater than or equal to 0 and being less than or equal to F−1.

In an exemplary implementation, the apparatus provided by the embodiment may further include a determination module. The determination module is configured to determine a value of N and values of the N pieces of beam information. Exemplarily, the second feedback module 1002 is further configured to feed back the value of N or a use occasion of the N pieces of beam information.

For the related description of the information feedback apparatus provided by the embodiment, reference may be made to the embodiment of the information feedback method of the first communication node side shown in FIG. 4, which is not repeated herein.

Figure 11:
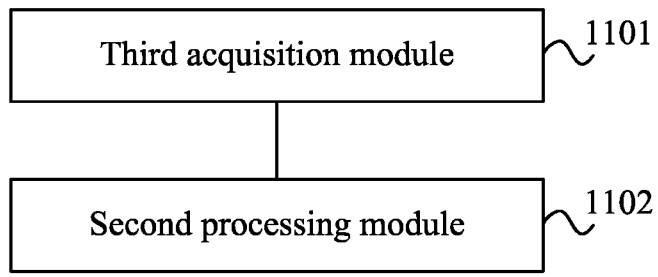
FIG. 11 is a schematic diagram of an information acquisition apparatus according to an embodiment of the present application.

FIG. 11 is a diagram showing an information acquisition apparatus according to an embodiment of the present application. As shown in FIG. 11, the information acquisition apparatus provided by the embodiment is applied to the second communication node (such as a base station). The apparatus includes a third acquisition module 1101. The third acquisition module 1101 is configured to acquire N pieces of beam information through a manner of reception or a manner of self-determination, where N is a positive integer.

In an exemplary implementation, the third acquisition module 1101 is further configured to receive F pieces of channel state information corresponding to the N pieces of beam information, where F is a positive integer.

In an exemplary implementation, the F pieces of channel state information are acquired according to F channel state information reference resources. An (n1+k_i)-th slot corresponds to an i-th channel state information reference resource, and an n1-th slot corresponds to a channel state information reference resource corresponding to the first CSI report. n1 and k_i are positive integers, k_i is less than or equal to k_j, i is less than j, each of i and j is a positive integer being greater than 0 and being less than or equal to F, or each of i and j is a positive integer being greater than or equal to 0 and being less than or equal to F−1.

In an exemplary implementation, the third acquisition module 1101 is further configured to receive a value of N or a use occasion of the N pieces of beam information. The information acquisition apparatus provided by the embodiment may further include a second processing module 1102. The second processing module 1102 is configured to determine the value of N and values of the N pieces of beam information according to the received value of N or the received use occasion of the N pieces of beam information.

In an exemplary implementation, the information acquisition apparatus provided by the embodiment may include an indication module. The indication module is configured to indicate the N pieces of beam information through at least one of higher layer signaling or physical layer signaling.

For the related description of the information acquisition apparatus provided by the embodiment, reference may be made to the embodiment of the information acquisition method of the second communication node side, which is not repeated herein.

The embodiment of the present application further provides a communication node including a memory and a processor. The memory is configured to store a computer program which, when executed by the processor, implements the above information feedback method of the first communication node side, such as steps shown in FIG. 2 or FIG. 4.

Figure 12:
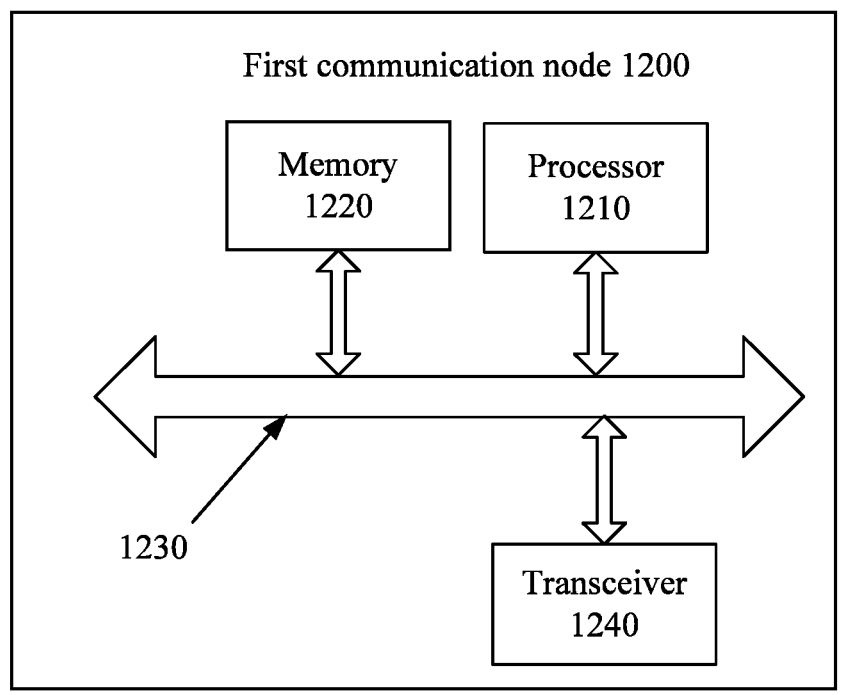
FIG. 12 is a schematic diagram of a first communication node according to an embodiment of the present application.

FIG. 12 is a diagram showing a first communication node according to an embodiment of the present application. As shown in FIG. 12, in an example, the first communication node 1200 (such as a terminal) may include a processor 1210, a memory 1220, a bus system 1230 and a transceiver 1240. The processor 1210, the memory 1220 and the transceiver 1240 are connected through the bus system 1230, the memory 1220 is configured to store instructions, and the processor 1210 is configured to execute the instructions stored in the memory 1220 to control the transceiver 1240 to send signals. The operations of the first feedback module and the second feedback module in the above information feedback apparatus may be executed by the transceiver under the control of the processor, and the operations of the first acquisition module and the second acquisition module may be executed by the processor.

The processor 1210 may be a central processing unit (CPU), and the processor 1210 may also be a general-purpose processor, a digital signal processor (DSP), an application-specific integrated circuit (ASIC), a field-programmable gate array (FPGA) or other programmable logic devices, discrete gates or transistor logic devices, or discrete hardware components. The general-purpose processor may be a microprocessor or any conventional processor.

The memory 1220 may include a read-only memory and a random-access memory, and provide instructions and data to the processor 1210. Part of the memory 1220 may also include a non-volatile random-access memory. For example, the memory 1220 may also store device type information.

In addition to a data bus, the bus system 1230 may further include a power bus, a control bus and a status signal bus. However, for the sake of clarity, various buses are all marked as the bus system 1230 in FIG. 12.

In the implementation process, the processing executed by the first communication node 1200 may be performed by an integrated logic circuit of hardware or instructions in software form in the processor 1210. That is, the steps of the methods disclosed in the embodiments of the present application may be implemented by a hardware processor, or may be implemented by a combination of hardware and software modules in the processor. The software modules may be located in a random-access memory, a flash memory, a read-only memory, a programmable read-only memory, an electrically erasable programmable memory, a register or another storage medium. The storage medium is located in the memory 1220. The processor 1210 reads information in the memory 1220 and implements the steps of the above methods in combination with hardware of the processor. To avoid repetition, it is not described in detail herein.

The embodiment of the present application further provides a communication node including a memory and a processor. The memory is configured to store a computer program which, when executed by the processor, implements the above information reception method or information acquisition method of the second communication node side, such as steps shown in FIG. 3 or FIG. 5.

Figure 13:
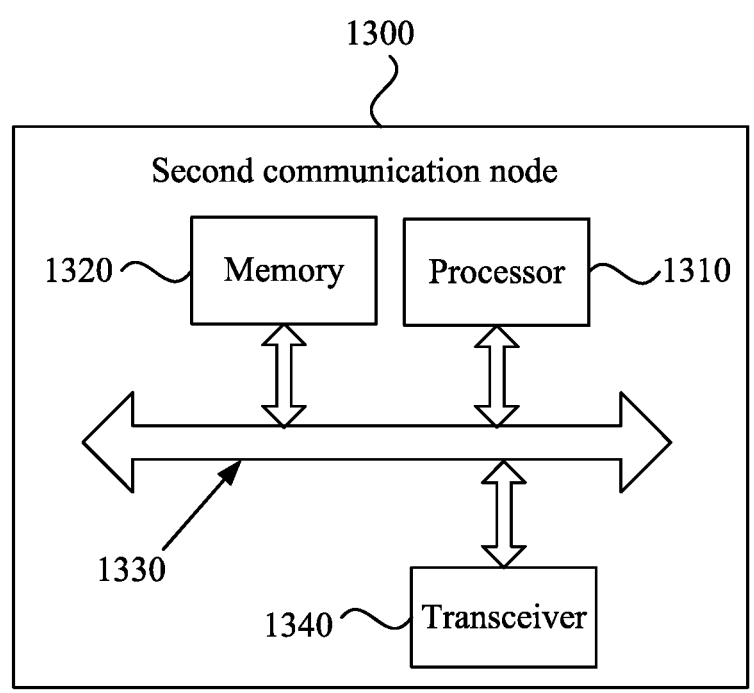
FIG. 13 is a schematic diagram of a second communication node according to an embodiment of the present application.

FIG. 13 is a diagram showing a second communication node according to an embodiment of the present application. As shown in FIG. 13, in an example, the second communication node 1300 (such as a base station) may include a processor 1310, a memory 1320, a bus system 1330 and a transceiver 1340. The processor 1310, the memory 1320 and the transceiver 1340 are connected through the bus system 1330, the memory 1320 is configured to store instructions, and the processor 1310 is configured to execute the instructions stored in the memory 1320 to control the transceiver 1340 to send signals. The operations of the reception module in the information reception apparatus and the third acquisition module in the information acquisition apparatus may be executed by the transceiver under the control of the processor, and the operations of the first processing module in the information reception apparatus and the second processing module in the information acquisition apparatus may be executed by the processor.

For related descriptions of the processor 1310, the memory 1320, the bus system 1330 and the transceiver 1340, reference may be made to the related descriptions of the processor 1210, the memory 1220, the bus system 1230 and the transceiver 1240, which are not repeated herein.

The embodiment of the present application further provides a computer-readable storage medium, which is configured to store a computer program which, when executed by a processor, implements the processing of any one of the methods described in the above embodiments of the present application, such as the information feedback method of the first communication node side shown in FIG. 2 or FIG. 4, or the information reception method of the second communication node side shown in FIG. 3, or the information acquisition method of the second communication node side shown in FIG. 5.

Function modules/units in all or part of the steps of the method, the system and the apparatus disclosed in the preceding description may be implemented as software, firmware, hardware or any appropriate combination thereof. In the hardware implementation, the division of the function modules/units described above may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). The term computer storage media include volatile and nonvolatile as well as removable and non-removable media implemented in any method or technology for storage of information (such as computer-readable instructions, data structures, program modules or other data). The computer storage media include, but are not limited to, a random-access memory (RAM), a read-only memory (ROM), an electrically erasable programmable read-only memory (EEPROM), a flash memory or another memory technology, a compact disc read-only memory (CD-ROM), a digital video disc (DVD) or another optical disc storage, a magnetic cassette, a magnetic tape, disk storage or another magnetic storage apparatus, or any other medium used for storing desired information and accessible by a computer. The communication medium generally includes computer-readable instructions, data structures, program modules or other data in a modulated data signal such as carriers or other transport mechanisms, and may include any information delivery medium.

What is claimed is:

1. An information feedback method, comprising:
acquiring K pieces of location information after a reference time; and
feeding back the K pieces of location information, wherein K is a positive integer;
wherein the K pieces of location information after the reference time refer to K pieces of location information corresponding to K future occasions after a current occasion;
wherein the method further comprises: acquiring N pieces of beam information corresponding to the K pieces of location information; and feeding back or indicating the N pieces of beam information, wherein N is a positive integer, and N is greater than or equal to K;
wherein two pieces of beam information corresponding to adjacent two pieces of location information of the K pieces of location information have a correlation;
wherein the two pieces of beam information having the correlation comprises at least one of: beam indexes corresponding to the two pieces of beam information being adjacent to each other; angles corresponding to the two pieces of beam information being adjacent to each other; a vector correlation corresponding to the two pieces of beam information being greater than a first threshold; or a vector distance corresponding to the two pieces of beam information being less than a second threshold.

2. The method according to claim 1, further comprising:
acquiring F pieces of channel state information (CSI) according to at least one of the K pieces of location information or the N pieces of beam information; and
feeding back the F pieces of channel state information, wherein F is a positive integer, and F is greater than or equal to K.

3. The method according to claim 1, wherein two pieces of channel state information corresponding to adjacent two pieces of location information of the K pieces of location information have a correlation.

4. An information reception method, comprising:
receiving K pieces of location information, wherein the K pieces of location information is K pieces of location information after a reference time, and K is a positive integer;
wherein the K pieces of location information after the reference time refer to K pieces of location information corresponding to K future occasions after a current occasion,
wherein the method further comprises: receiving N pieces of beam information corresponding to the K pieces of location information, wherein N is a positive integer, and N is greater than or equal to K;
wherein two pieces of beam information corresponding to adjacent two pieces of location information of the K pieces of location information have a correlation;
wherein the two pieces of beam information having the correlation comprises at least one of: beam indexes corresponding to the two pieces of beam information being adjacent to each other; angles corresponding to the two pieces of beam information being adjacent to each other; a vector correlation corresponding to the two pieces of beam information being greater than a first threshold; or a vector distance corresponding to the two pieces of beam information being less than a second threshold.

5. The method according to claim 4, further comprising:
receiving F pieces of channel state information (CSI), wherein the F pieces of channel state information are determined by at least one of the K pieces of location information or the N pieces of beam information, F is a positive integer, and F is greater than or equal to K.

6. The method according to claim 4, wherein two pieces of channel state information corresponding to adjacent two pieces of location information of the K pieces of location information have a correlation.

7. The method according to claim 5, further comprising at least one of:
determining L pieces of new channel state information by using the K pieces of location information and the F pieces of channel state information, wherein L is a positive integer;
determining L pieces of new channel state information by using the K pieces of location information, the N pieces of beam information and the F pieces of channel state information, wherein L is a positive integer; or
determining L pieces of new channel state information by using the N pieces of beam information and the F pieces of channel state information, wherein L is a positive integer.

8. An information feedback method, comprising:
acquiring N pieces of beam information after a reference time; and
feeding back or indicating the N pieces of beam information, wherein N is a positive integer;
wherein the N pieces of beam information after the reference time refer to N pieces of beam information corresponding to K future occasions after a current occasion;
wherein two pieces of beam information corresponding to adjacent two pieces of location information of K pieces of location information have a correlation;
wherein the two pieces of beam information having the correlation comprises at least one of: beam indexes corresponding to the two pieces of beam information being adjacent to each other; angles corresponding to the two pieces of beam information being adjacent to each other; a vector correlation corresponding to the two pieces of beam information being greater than a first threshold; or a vector distance corresponding to the two pieces of beam information being less than a second threshold.

9. The method according to claim 8, wherein the N pieces of beam information are acquired through the K pieces of location information after the reference time, wherein K is a positive integer.

10. The method according to claim 8, wherein the N pieces of beam information are acquired by receiving at least one of high layer signaling or physical layer signaling.

11. The method according to claim 8, further comprising:
acquiring F pieces of channel state information (CSI) corresponding to the N pieces of beam information, and feeding back the F pieces of channel state information, wherein F is a positive integer;

wherein the F pieces of channel state information are acquired according to F channel state information reference resources.

12. The method according to claim 11, wherein an (n1+k_i)-th slot corresponds to an i-th channel state information reference resource and an (n1+k_j)-th slot corresponds to an j-th channel state information reference resource, wherein an n1-th slot corresponds to a channel state information reference resource corresponding to a first CSI report, n1 and k_i are positive integers, k_i is less than or equal to k_j, i is less than j, each of i and j is an integer being greater than 0 and being less than or equal to F, or each of i and j is an integer being greater than or equal to 0 and being less than or equal to F−1.

13. The method according to claim 8, further comprising: determining a value of N and values of the N pieces of beam information.

14. The method according to claim 13, further comprising: feeding back the value of N or a use occasion of the N pieces of beam information.

15. An information feedback apparatus, applied to a terminal device, comprising:
at least one processor; and
a memory communicatively connected to the at least one processor; wherein
the memory stores instructions executable by the at least one processor to enable the at least one processor to perform the information feedback method of claim 1.

16. An information reception apparatus, applied to a base station, comprising:
at least one processor; and
a memory communicatively connected to the at least one processor; wherein
the memory stores instructions executable by the at least one processor to enable the at least one processor to perform the information reception method of claim 4.

* * * * *